(No Model.)
R. C. BOOKSER.
WHEEL HUB.
No. 548,771. Patented Oct. 29, 1895.
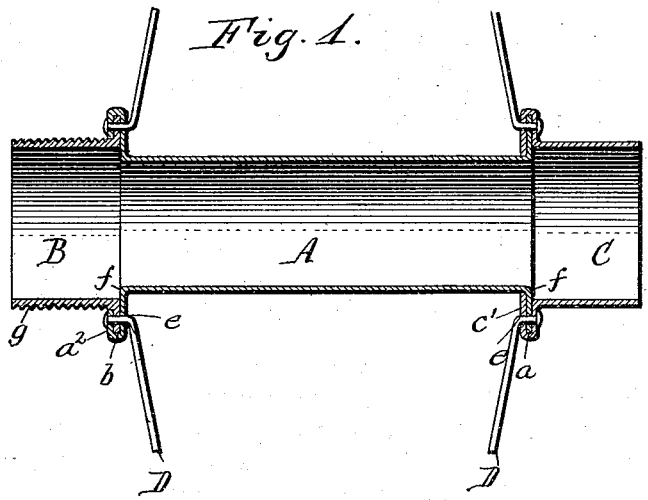
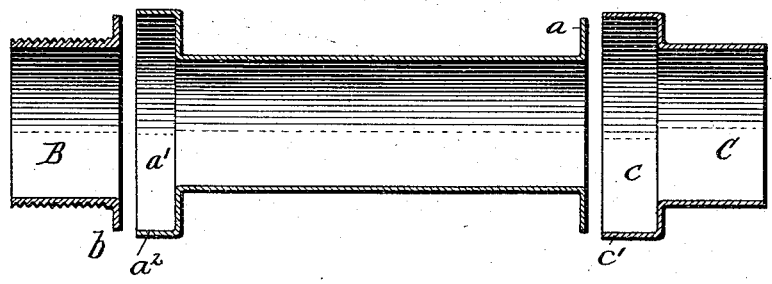
WITNESSES:
Chas. F. Burkhardt
Henry L. Deck.
R. C. Bookser INVENTOR.
By Wilhelm Bonner
ATTORNEYS.

UNITED STATES PATENT OFFICE.

RUDOLPH C. BOOKSER, OF BUFFALO, NEW YORK, ASSIGNOR OF ONE-THIRD TO JAMES M. COX, OF SAME PLACE.

WHEEL-HUB.

SPECIFICATION forming part of Letters Patent No. 548,771, dated October 29, 1895.

Application filed August 26, 1895. Serial No. 560,497. (No model.)

*To all whom it may concern:*

Be it known that I, RUDOLPH C. BOOKSER, a citizen of the United States, residing at Buffalo, in the county of Erie and State of New York, have invented a new and useful Improvement in Wheel-Hubs, of which the following is a specification.

My invention relates to sheet-metal wheel-hubs which are designed more particularly for bicycle-wheels and which are provided with perforated flanges to which the inner ends of the wire spokes are attached.

The object of the invention is to produce a light hub of this kind which can be cheaply manufactured.

In the accompanying drawings, Figure 1 is a longitudinal section of my improved hub. Fig. 2 is a similar view showing the parts separated and the form of the same before they are united.

Like letters of reference refer to like parts in both figures.

The hub is composed of three parts or sections—namely, a cylindrical body or comparatively long sleeve A and two short sleeves or collars B and C, secured to opposite ends of the sleeve and receiving the usual ball-bearings. The central sleeve A is formed at one end with an outwardly-extending annular flange $a$ and at its opposite end with an annular enlargement, socket, or groove $a'$. One of the end collars—for instance, the collar B—is formed at its inner end with an annular flange $b$, which bears against the bottom of the socket of the central sleeve and is confined therein by the outer portion $a^2$ of the socket, which is bent inwardly over said flange, forming with the flange a three-ply joint, whereby the collar and the central sleeve are united. The other collar C is formed at its inner end with an annular enlargement or socket or groove $c$, similar to the sleeve-socket which receives the flange $a$ of the sleeve, and has its outer portion $c'$ bent inwardly over said flange, forming a three-ply joint similar to that which connects the collar B to the sleeve. These interlocking flanges and sockets form the projecting annular hub—flanges to which the inner ends of the spokes D are attached, the flanges being provided with perforations $e$ for the passage of the spokes. The spokes thus pass through the interlocking parts of the sleeve and collars and tie the same together, thereby effectually preventing their separation.

The central sleeve is preferably smaller in diameter than the end collar, as shown, so as to form internal annular shoulders or offsets $f$ at the junction of the sleeve and collars, which form seats for the inner bearing cones or wings of the ball-bearings.

One of the end collars is provided with an external screw-thread $g$, which is adapted to engage with the internal thread of the usual sprocket or driving wheel, which latter is not shown in the drawings.

Before assembling the parts of the hub the walls of the annular sockets of the central sleeve and the collar C are straight, as shown in Fig. 2, and after inserting the collar B in the socket of the sleeve and passing the socket of the other collar C over the flange of the sleeve the outer portions of these sockets are bent over or around the flanges of the sleeve and the collar B, as hereinbefore described, after which the three-ply hub-flanges so formed are perforated to receive the spokes.

The flanges are readily rolled upon the collar C and sleeve A, and the sleeve and the other collar are formed with their sockets by drawing these parts in suitable dies.

I claim as my invention—

1. A wheel hub consisting of a central sleeve and end collars united to the opposite ends of the sleeve, said parts being provided at their meeting ends with interlocking flanges and grooves or sockets forming projecting flanges for the attachment of the spokes, substantially as set forth.

2. A wheel hub, consisting of a central sleeve provided at one end with an outwardly projecting flange and at its opposite end with a socket or groove, a collar arranged at one end of said sleeve and provided with a projecting flange which is confined in the socket or groove of said sleeve, and a collar arranged at the opposite end of the sleeve and having a socket or groove in which the flange of the sleeve is confined, substantially as set forth.

3. A wheel hub consisting of a central sleeve provided at one end with a projecting flange and at its opposite end with a socket or groove, and end collars of larger diameter than said sleeve, provided with a socket or groove and
5 a projecting flange, respectively, which interlock with the corresponding parts of the central sleeve, substantially as set forth.

Witness my hand this 16th day of August, 1895.

RUDOLPH C. BOOKSER.

Witnesses:
 JNO. J. BONNER,
 ELLA R. DEAN.